July 1, 1969   D. D. HALLOCK ET AL   3,453,490
ION LASER STARTING CIRCUIT
Filed Feb. 26, 1968
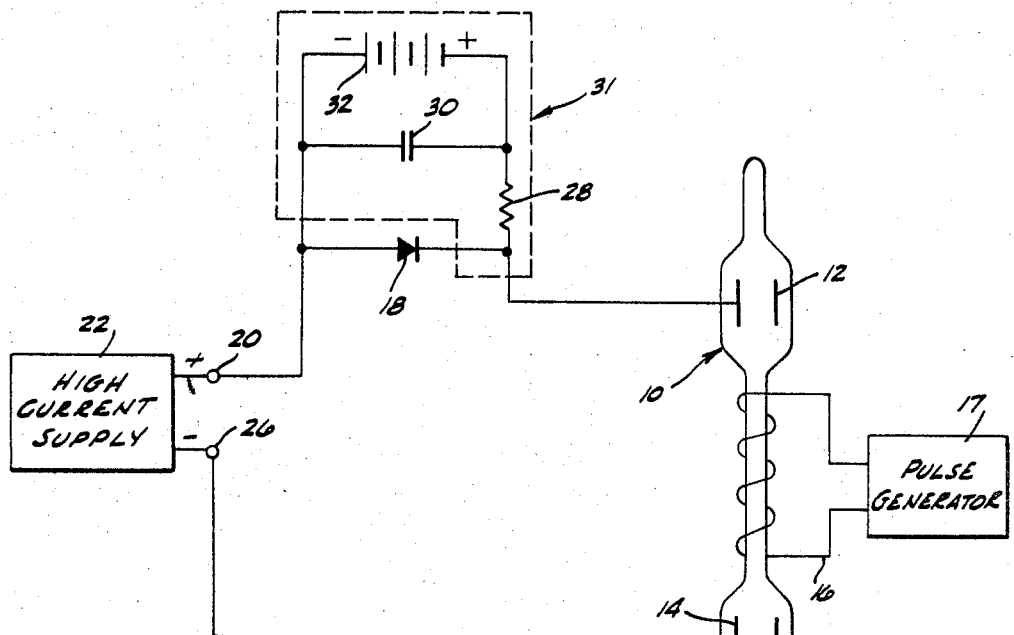
Fig. 1.
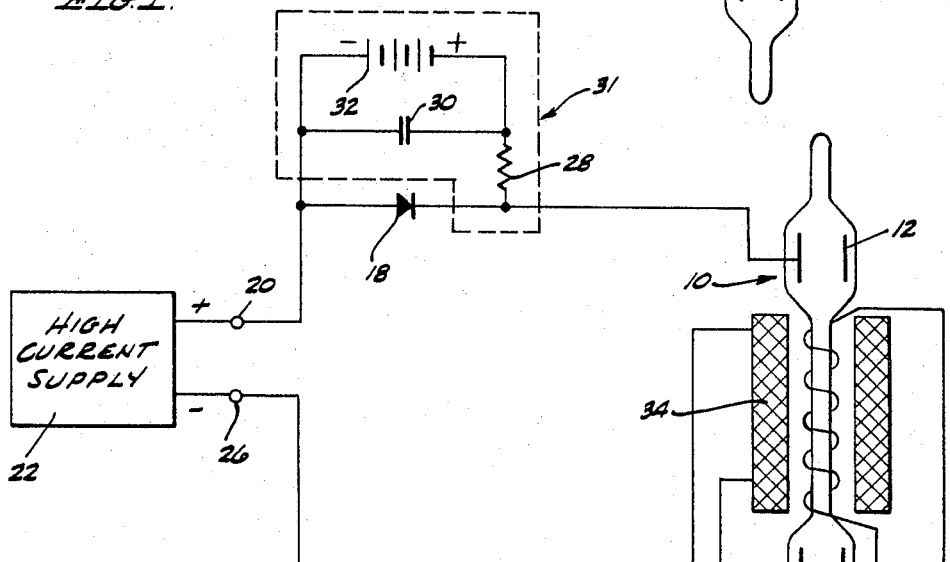
Fig. 2.
INVENTORS.
DAVID D. HALLOCK,
HARVEY W. DAIN,
BY
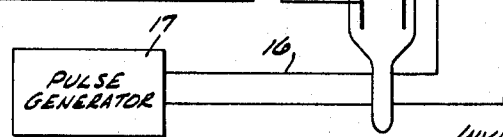
ATTORNEY.

United States Patent Office 3,453,490
Patented July 1, 1969

3,453,490
ION LASER STARTING CIRCUIT
David D. Hallock and Harvey W. Dain, Palos Verdes Peninsula, Calif., assignors to Hughes Aircraft Company, Culver City, Calif., a corporation of Delaware
Filed Feb. 26, 1968, Ser. No. 708,408
Int. Cl. H05b *37/02, 41/14*
U.S. Cl. 315—170
10 Claims

ABSTRACT OF THE DISCLOSURE

The disclosed ion laser starting circuit comprises a laser discharge tube, a high current power supply and a booster power supply. The two power supplies are connected in series across the electrodes of the discharge tube. The booster power supply includes a capacitor and a capacitor charging power supply connected in parallel, with the positive terminal of the capacitor charging supply connected to the cathode of an associated diode. The diode is connected such that when it becomes forward biased, after the capacitor discharges sufficiently, the booster power supply is effectively disconnected from the circuit.

---

This invention relates to laser control circuits and more particularly it relates to circuitry for simply, economically and reliably starting an ion laser.

In a typical starting sequence for an ion laser, first a high voltage of several thousand volts is applied for a very short period of time to or in the vicinity of the laser discharge tube, i.e., the container in which the gaseous working medium for the ion laser is held. This high voltage spike forms free ions in gaseous working medium. If, during the occurrence of the high voltage spike, a sufficient D.C. voltage (this voltage is usually supplied by a current regulated, high current D.C. power source) is applied between the anode and cathode of the discharge tube, an electrical discharge will commence within the tube. This discharge may for convenience of description be roughly characterized by three sequentially occurring phases: first a discharge characterized by a substantially constant voltage as the current applied between the anode and cathode increases; second, a discharge characterized by a negative resistance of the gaseous medium as measured between the anode and cathode of the tube, so that as the current flow between these electrodes increases, the voltage across the electrode decreases; and third, a discharge characterized by positive resistance of the gaseous medium as measured between the anode and the cathode of the discharge tube. The first phase and the low current portion of the second phase are often referred to as a glow discharge of the gaseous medium within the tube. The third phase and the high current portion of the second phase are referred to as arc discharge phases. These three successive phases provide a substantially concave voltage versus current characteristic for the gaseous medium within the discharge tube.

In the second phase, for a given decrease in the voltage applied between the anode and cathode of the tube, the current through the gaseous element increases by a relatively small amount; however, in the third phase a relatively large change in current results from a similar voltage increase between the anode and the cathode of the tube. In other words, the first phase is characterized by a substantially zero slope, the second phase is characterized by a relatively large negative slope, and the third phase has a comparatively small positive slope (when plotting the three phases of the voltage versus current characteristic of the gaseous medium within the tube). It is further pointed out that the transition between the second and third phases occurs gradually, as the voltage-current characteristic traverses a "rounded" zero slope point which roughly indicates transition from the second to the third phase.

An ion laser tube is normally operated in the third phase of the discharge in the gaseous medium within the tube and at a current near the aforementioned zero slope point. However, the tube may be operated in the second phase if sufficient resistors are employed to make the overall resistance, as seen by the power supply, positive.

The initial voltage required to commence the first phase of the discharge, i.e., at the low current end of the voltage versus current characteristic of the gaseous medium, may be larger than the operating voltage of the laser by a factor of two times, for example. Since the third phase typically commences on the order of one millisecond after the first phase is initiated, the initial voltage applied between the anode and cathode of the tube must be quickly reduced because the same applied voltage in the third phase could result in a current sufficiently large to destroy the laser tube and its associated equipment. Therefore, either the high voltage applied initially to start the first phase must be quickly reduced or the current surge through the gaseous medium within the tube as the three discharge phases occur must be limited. The voltage response time for standard regulated supplies furnishing voltages of the magnitude required for ion laser applications is typically of the order of 50 milliseconds, a time far too slow to adequately limit the aforementioned current surge.

Previously, the current surge was reduced by employing a large ballast resistor in series with a high current power supply. As was required, the value of the ballast resistor was reduced in several steps by means of electronic relays, for example, to a desired low value, or to zero. When a current regulated power supply was used, the voltage applied to the tube was reduced in steps either manually or automatically. The size and weight associated with these ballast resistors and the dissipation of heat generated by them adds greatly to the cost of the laser starting circuitry. Furthermore, the power output requirements of the high current supplies must be large enough to overcome the dissipation of power in the ballast resistors. This further increases the expense, size and weight of a typical prior art laser starting circuit.

Accordingly, it is an object of the present invention to provide simple, economical and reliable means for starting an ion laser.

It is a further object of the present invention to provide an ion laser starting circuit in which a minimum amount of power is needed and in which no current limiting ballast resistors need be employed.

It is another object of the present invention to provide a simple and economical circuit for starting an ion discharge type gas laser that can incorporate a magnetic field producing coil in series with the main power supply in order to increase the power output of the laser.

In accordance with the foregoing objects, an ion laser starting circuit according to the present invention includes a laser discharge tube having first and second electrodes, with a high current power supply and a booster power supply connected in series between the first and second electrodes. The booster supply includes a capacitor and means for charging the capacitor connected in parallel. A diode is connected across the booster power supply and means for applying a high voltage, short duration starting pulse to the discharge tube is disposed in the vicinity of the discharge tube.

Additional objects, advantages and characteristic features of the present invention will become more readily apparent from the following detailed description of preferred embodiments of the invention when considered in conjunction with the accompanying drawings in which:

FIG. 1 is a schematic diagram illustrating one embodiment of a starting circuit for an ion laser according to the invention; and FIG. 2 is a schematic diagram illustrating another embodiment of a starting circuit for an ion laser according to the invention.

Referring to FIG. 1 with more particularity, there is shown a laser discharge tube 10 having an anode 12 and a cathode 14. A small diameter wire 16 through which a short (approximately 1 microsecond, for example) high voltage discharge starting pulse from pulse generator 17 may be applied is disposed in the vicinity of the discharge tube 10. Specifically, the wire 16 may be wrapped around the bore of the discharge tube 10 as illustrated in FIG. 1. It is pointed out that, alternatively, the high voltage pulse may be applied directly to the anode 12. The particular manner of applying the starting voltage pulse and the type of pulse generator 17 required to generate the pulse in wire 16 are not critical to the invention.

The anode 12 is connected, via a diode 18, to positive terminal 20 of a current regulated, high current power supply 22. The cathode of diode 18 is connected to the anode 12 of tube 10, while the anode of diode 18 is connected to terminal 20. The cathode 14 of the discharge tube 10 is connected to negative terminal 26 of the high current supply 22. High current supply 22 must be capable of supplying sufficient current for operations of the discharge tube 10, and it must be regulated sufficiently to provide an essentially constant current. Ten amps. at 200 volts are typical operating values.

The diode 18 must be capable of enduring the current magnitudes generated in the circuit; it may be a 35 amp. diode (IN1190), for example. The cathode of diode 18 is connected to one end of a resistor 28 which may be approximately 10 ohms, for example. Connected between the anode of diode 18 and the other end of resistor 28 is a capacitor 30. Capacitor 30 must be capable of supplying a voltage which is essentially equal to the difference between the voltage required to maintain the glow discharge phase and the operating voltage of laser tube 10. Typically, capacitor 30 is of the order of 20 μf. A capacitor charging supply 32, illustrated in FIG. 1 as a battery, is connected across the electrodes of the capacitor 30 such that the negative terminal of power supply 32 is connected to the anode of the diode 18. The positive terminal of power supply 32 is thus connected, via resistor 28, to the cathode of the diode 18. Although power supply 32 is illustrated in FIG. 1 as a battery, it is understood that other means of supplying D.C. power may be used. The circuitry including capacitor 30, resistor 28 and power supply 32 functions as a boost power supply, designated generally as 31.

In the operation of the starting circuit illustrated in FIG. 1, a high voltage pulse (of several thousand volts magnitude, for example) is first applied by pulse generator 17 through wire 16. Little or no current flows through the circuit at this time since the gas in tube 10 is in essence non-conductive. Also, at this time diode 18 is back biased, preventing the capacitor from discharging through diode 18. Capacitor 30, having been charged by power supply 32, supplies a voltage (approximately 200 volts, for example) which, in addition to the voltage supplied by the high current supply 22 (approximately 200 volts, for example), is of a magnitude sufficient to start and maintain the first phase of the discharge (glow discharge) of the gas within tube 10. The voltage required to start and maintain the first phase may be approximately 400 volts, for example. The capacitor 30 discharges through resistor 28 such that the voltage and current of capacitor 30 corresponds substantially to the voltage versus current characteristic of the gas within tube 10 during the second phase of the discharge of the gas within tube 10. When the capacitor 30 has discharged sufficiently, the diode 18 becomes forward biased so as to essentially electronically remove boost power supply 31 from the remainder of the circuit.

The above-described circuit has been successfully used in starting many different types of ion lasers. Although the circuit and technique herein shown have been described with reference to an ion laser, however, other devices which have similar voltage or current requirements may also utilize the invention.

A second embodiment of the invention is illustrated in FIG. 2. This embodiment is similar to the embodiment illustrated in FIG. 1 and component elements of the starting circuit illustrated in FIG. 2 that are the same as, or similar to, corresponding component elements illustrated in FIG. 1 are designated by the same reference numerals as their counterpart elements. However, in the FIG. 2 embodiment magnetic field generating means, illustrated as a wire coil 34, is substantially annularly disposed around tube 10, such that the field lines of the generated magnetic field are substantially parallel to the major axis of tube 10. The magnetic field produced by coil 34 confines the gaseous medium, or plasma, within the discharge tube 10 and thereby enhances the power output of the laser.

When applying a magnetic field to tube 10 by means of coil 34 or otherwise, the voltage applied to the gaseous medium within tube 10 for a given current has generally a smaller value than when no magnetic field is applied. Typically the operating voltage of tube 10 in the arc discharge phase is 25 percent lower with a magnetic field applied (a difference of the order of 50 volts, for example).

In order to bring the current to the desired level of operation as quickly as possible, the high current supply 22 must initially supply between the anode and the cathode of tube 10, an additional voltage, higher than the operational voltage required to maintain the desired level of discharge in tube 10. This additional voltage may be approximately 100 volts, for example. Once the current has reached the desired level of operation, this additional voltage represents an unused voltage capability of supply 22 that may be used to operate the coil 34. If coil 34 is selected to make use of this additional voltage at a desired level of current, the starting voltage on supply 22 need not change; hence the current supply 22 need not be internally regulated.

When employing the circuit of FIG. 2, the voltage required to start and maintain a glow discharge is higher by about 50 percent, for example, than the value of voltage required when the coil 34 is operated by a separate power supply. However, this does not add significantly to the cost or complexity of the starting circuit, since only the capability of booster supply 31 must be increased.

By using a magnetic field producing coil in series with the discharge tube, many advantages may be realized. First, a separate coil power supply may be eliminated with a considerable savings in cost, size and weight to the circuit. Second, the coil functions as a ballast resistor, so that the discharge tube may be operated at a low current. Third, the resistive load of the coil reduces the current surge when the discharge is started. And, fourth, the main power supply need not be a current regulated one.

Although the present invention has been shown and described with reference to particular embodiments, nevertheless, various changes and modifications obvious to one skilled in the art to which the invention pertains are deemed to lie within the spirit, scope and contemplation of the invention.

What is claimed is:
1. An ion laser starting circuit comprising:
 an ion laser discharge tube having first and second electrodes, a high current power supply and a booster power supply connected in series between said first and second electrodes;
 said booster supply including a capacitor and means for charging said capacitor connected in parallel;
 a diode connected across said booster supply; and
 means for applying a high voltage, short duration pulse to said discharge tube.

2. An ion laser starting circuit comprising:
an ion laser discharge tube having first and second electrodes, a first power supply and a second power supply connected in series between said first and second electrodes;
switching means for selectively electrically connecting and disconnecting said second power supply with said first power supply and said discharge tube; and
said second power supply including a capacitor and means for charging said capacitor connected across said means for switching.

3. An ion laser starting circuit according to claim 2 wherein said switching means is a diode.

4. An ion laser starting circuit comprising:
an ion laser discharge tube having an anode and a cathode;
a current regulated power supply;
a diode having a cathode connected to said anode of said discharge tube and having an anode connected to a positive terminal of said power supply;
a capacitor connected between said anode of said diode and said cathode of said diode; and
means for charging said capacitor connected in parallel with said capacitor and said diode, said charging means having a negative terminal connected to said anode of said diode and a positive terminal connected to said cathode of said diode.

5. An ion laser starting circuit comprising:
an ion laser discharge tube having an anode and a cathode;
a current regulated power supply;
a diode having a cathode connected to said anode of said discharge tube and having an anode connected to a positive terminal of said power supply;
a resistor having a first terminal and a second terminal, said first terminal being connected to said cathode of said diode;
a capacitor connected between said anode of said diode and said second terminal; and
means for charging said capacitor connected in parallel with said capacitor, said charging means having a negative terminal connected to said anode of said diode and a positive terminal connected to said second terminal.

6. An ion laser starting circuit comprising:
an ion laser discharge tube having first and second electrodes, a high current power supply, means for producing a magnetic field, and a booster power supply connected in series between said first and second electrodes;
said booster supply including a capacitor and means for charging said capacitor connected in parallel;
a diode connected across said booster supply; and
means for applying a high voltage, short duration pulse to said discharge tube.

7. An ion laser starting circuit comprising:
an ion laser discharge tube having first and second electrodes, a first power supply, a second power supply, and
means for applying a magnetic field to said discharge tube, all connected in series between said first and said second electrodes;
switching means for selectively electrically connecting and disconnecting said second power supply from the series circuit; and
said second power supply including a capacitor and means for charging said capacitor connected across said switching means.

8. An ion laser starting circuit according to claim 7 wherein said means for switching is a diode and said means for applying a magnetic field is a wire coil.

9. An ion laser starting circuit comprising:
an ion laser discharge tube having an anode and a cathode;
a power supply;
a diode having a cathode connected to said anode of said discharge tube and having an anode connected to a positive terminal of said power supply;
a capacitor connected between said anode of said diode and said cathode of said diode;
means for charging said capacitor connected in parallel with said capacitor and said diode, said charging means having a negative terminal connected to said anode of said diode and a positive terminal connected to said cathode of said diode; and
a wire coil connected between said cathode of said discharge tube and a negative terminal of said power supply, said coil applying a magnetic field to said laser discharge tube.

10. An ion laser starting circuit comprising:
an ion laser discharge tube having an anode and a cathode;
a power supply;
a diode having a cathode connected to said anode of said discharge tube and having an anode connected to a positive terminal of said power supply;
a resistor having a first terminal and a second terminal, said first terminal being connected to said cathode of said diode;
a capacitor connected between said anode of said diode and said second terminal;
means for charging said capacitor connected in parallel with said capacitor, said charging means having a negative terminal connected to said anode of said diode and a positive terminal connected to said second terminal; and
a magnetic field producing wire coil connected between said cathode of said discharge tube and a negative terminal of said power supply, said coil being disposed annularly around the major axis of said discharge tube and applying a magnetic field to said discharge tube along a direction substantially parallel to said major axis.

References Cited

UNITED STATES PATENTS 2,955,233  10/1960  Paley et al. _____ 315—273 X

CHARLES L. WHITHAM, *Primary Examiner.*

U.S. Cl. X.R.

315—241; 331—94.5